(12) United States Patent
Bovo et al.

(10) Patent No.: US 9,301,213 B1
(45) Date of Patent: Mar. 29, 2016

(54) SYSTEMS, METHODS AND DEVICES FOR DETERMINING KEY PERFORMANCE INDICATORS USING INFERENTIAL STATISTICS

(71) Applicant: Tektronix, Inc., Beaverton, OR (US)

(72) Inventors: Antonio Bovo, Padua (IT); Vignesh Janakiraman, Plano, TX (US)

(73) Assignee: Tektronix Texas, Inc., Westford, MA (US)

( * ) Notice: Subject to any disclaimer, the term of this patent is extended or adjusted under 35 U.S.C. 154(b) by 81 days.

(21) Appl. No.: 14/484,888

(22) Filed: Sep. 12, 2014

(51) Int. Cl.
*H04L 12/26* (2006.01)
*H04W 36/00* (2009.01)
*H04W 24/02* (2009.01)
*H04W 24/10* (2009.01)

(52) U.S. Cl.
CPC .......... *H04W 36/0022* (2013.01); *H04W 24/02* (2013.01); *H04W 24/10* (2013.01)

(58) Field of Classification Search
CPC ............ H04L 12/2467; H04L 12/2605; H04L 12/2607; H04L 12/2634; H04L 12/2618; H04L 12/2621; H04L 12/2623; H04L 12/2686; H04L 12/2471; H04L 41/5009; H04L 43/08; H04L 29/08675
See application file for complete search history.

(56) References Cited

U.S. PATENT DOCUMENTS

| | | | |
|---|---|---|---|
| 2006/0203738 A1* | 9/2006 | Fok ........................ | H04B 17/26 370/252 |
| 2010/0316000 A1* | 12/2010 | Burbidge .......... | H04W 36/0022 370/328 |

* cited by examiner

*Primary Examiner* — Alvin Zhu
(74) *Attorney, Agent, or Firm* — Locke Lord LLP; Scott D. Wofsy; Christopher J. Capelli

(57) ABSTRACT

Network monitoring devices and network monitoring techniques are disclosed and use inferential statistical approaches to determine one or more Key Performance Indicators, particularly for Circuit Switched FallBack (CSFB) scenarios. For example, the network monitoring node monitors a plurality of ciphered or clear text messages for a network interface in a communication network, determines a Mobile Terminating (MT) count for MT calls and a Mobile Originating (MO) count for User Equipment (UE) from at least one message of the plurality of messages and defines an inferred MT ratio based on the MT count and the MO count for a total number of messages. The network monitoring device further applies the inferred MT ratio to a CSFB idle mode count for UE and/or a CSFB active mode count for UE to yield an estimated total number of CSFB idle mode successes and an estimated total number of CSFB active mode successes, respectively.

19 Claims, 9 Drawing Sheets

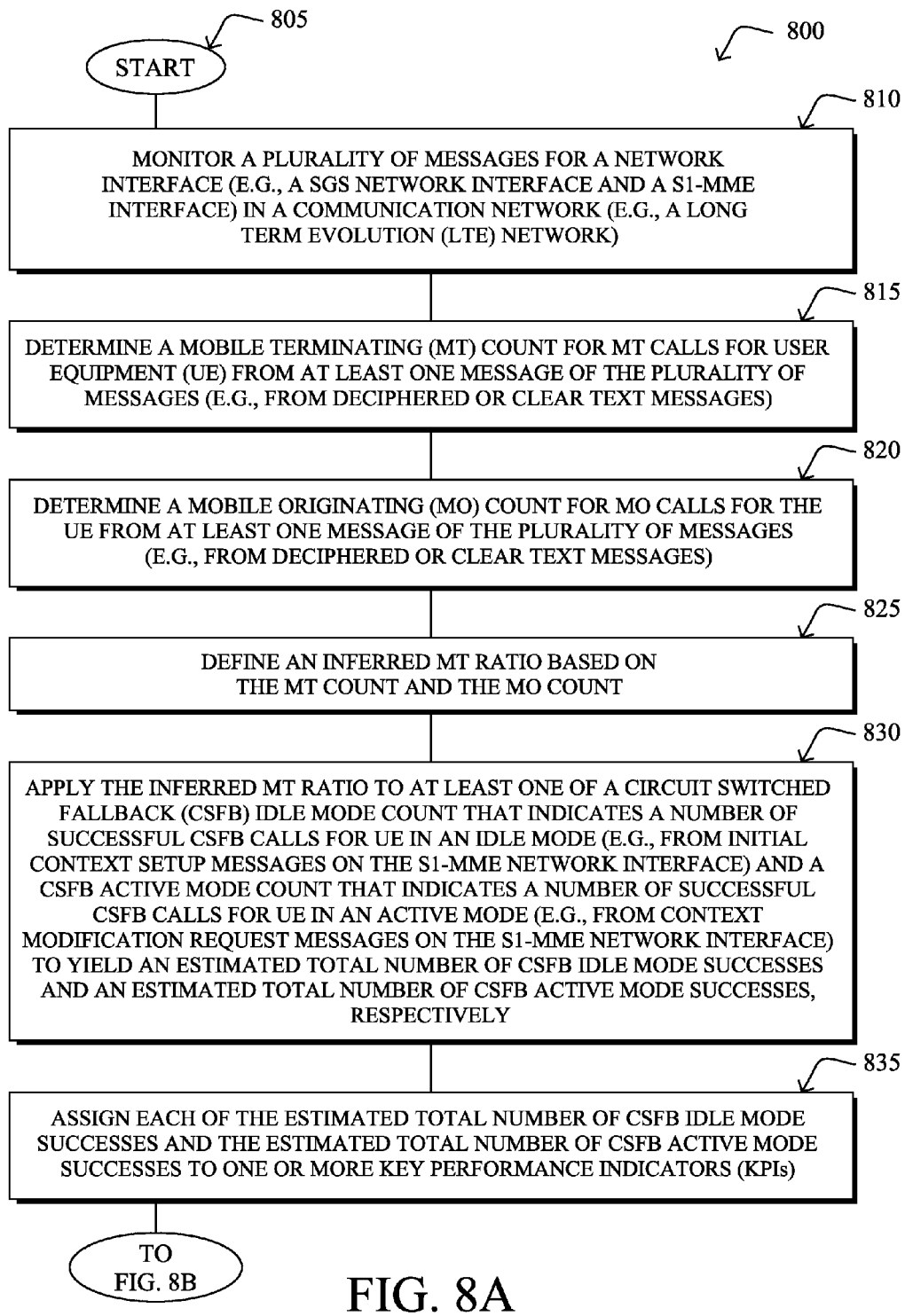

SYSTEMS, METHODS AND DEVICES FOR DETERMINING KEY PERFORMANCE INDICATORS USING INFERENTIAL STATISTICS

BACKGROUND

1. Field of the Invention

The present disclosure relates to network monitoring in communication networks, and more particularly, to determining Key Performance Indicators (KPIs) using inferential statistics.

2. Description of the Related Art

One typical need for Network Operators is measuring network performances, troubleshooting network nodes, interfaces, and the like, and controlling the services' behavior.

There are several use cases regarding these aspects as the deployment of new network technology in field, the control of new services or simply the performance management of the network to prevent instability, overload and other issues on the network.

In order to deal with these challenges, Network Operators often use external monitoring systems. These monitoring systems are typically connected to the network in non-intrusive mode, sniffing and processing the traffic data and providing feedbacks to the Network Operators. This output can be protocol analysis data, call trace data, service trends, aggregated measurements, and the like.

Key Performance Indicators (KPIs) are an example of aggregated measurements suitable for network monitoring. In brief, KPIs are performance, quality or traffic measurements done on the network, aggregated per time interval (e.g. every 5 min, etc.) and are typically tied up to "dimensions", which are the objects they refer to. In order to provide effective KPIs for analyzing the behavior of Telecommunication networks, it is often necessary to account for information from different sources or network interfaces and correlate such information together.

For example, accounting for the information from different sources or network interfaces can include checking a specific service scenario spread all over the network (e.g. an end-to-end correlation of a mobile originating call with a mobile terminating call, etc.) or evaluating network behavior on specific trigger events that involves several elements in the network (e.g. an handover triggered on the source LTE radio access technology and completed on the target UTRAN radio access technology, etc.).

Accounting for the information and correlating such information is often the only method to gain information about a specific network scenario that involves complex relations on different interfaces or even on different radio access technologies.

However, correlating information and data is generally complex and also expensive in terms of monitoring resources. Despite efforts to date, such correlation remains a preferred technique for accounting for the information from various interfaces and sources. Accordingly, the approaches and techniques described herein provide for improved network monitoring to determine KPIs without requiring the expensive and complex traditional information correlation, but instead employ one or more inferential statistical techniques.

SUMMARY

Disclosed herein are techniques and devices employing the same that determine Key Performance Indicators (KPIs) using inferential statistics obviating the conventional need to correlate data throughout network interfaces. The techniques and devices are particularly described with respect to a Circuit Switched FallBack scenario in a Long Term Evolution (LTE) communication network for purposes of illustration and not limitation. Such techniques and devices particularly reduce the amount of total network monitoring (e.g., tap or monitoring points) and reduce the overall complexity, cost, and bandwidth required to compute various KPIs.

According to one or more embodiments of this disclosure, network monitoring techniques (and network monitoring devices employing the same) use inferential statistical approaches to determine one or more Key Performance Indicators, particularly for Circuit Switched FallBack (CSFB) scenarios. In one particular embodiment, a network node, for example, monitors a plurality of messages for a network interface (e.g., a S1-MME interface, a SGs interface, interfaces terminated at a Mobile Management Entity (MME) node, etc.) in a communication network such as a Long Term Evolution (LTE) network. The network monitoring system or node determines a Mobile Terminating (MT) count for CSFB MT calls for User Equipment (UE) from at least one message of the plurality of messages such as Extended Service Request messages marked for MT service. Similarly, the network monitoring system also determines a Mobile Originating (MO) count for CSFB MO calls for UE from at least one message of the plurality of messages, such as Extended Service Request marked for MO service. Generally, the MT count for MT calls and the MO count for MO calls is determined by deciphered or clear text messages (e.g., excluding ciphered messages). According to these embodiments, the total amount of MT or MO CSFB calls is estimated and takes into account calls with ciphered signaling. In this fashion, information from the deciphered CSFB calls is determined and used to infer statistical counts for the entire CSFB calls, even the ciphered ones. In order to do this, the network monitoring system defines an inferred MT ratio (e.g., using inferential statistics) based on the MT count and the MO count and applies the inferred MT ratio to at least one of a (MO+MT) Circuit Switched FallBack (CSFB) idle mode count that indicates a number of successful (MO+MT) CSFB calls for UE in an idle mode and a (MO+MT) CSFB active mode count that indicates a number of successful CSFB calls for UE in an active mode to yield an estimated total number of MT CSFB idle mode successes and an estimated total number of MT CSFB active mode successes, respectively. The network monitoring system also assigns each of the estimated total number of MT CSFB idle mode successes and the estimated total number of MT CSFB active mode successes to one or more Key Performance Indicators (KPIs) and provides the one or more KPIs to a display to cause the display to show the one or more KPIs to a user. The network monitoring node, in some embodiments, further aggregates the estimated total number of MT CSFB idle mode successes and the estimated total number of MT CSFB active mode successes to yield an estimated total number of MT CSFB call successes and assigns such estimated total number of MT CSFB call successes to one or more KPIs. Likewise, it is appreciated that a similar process can be applied to estimate the total number of MO CSFB calls.

In certain embodiments, the network monitoring node further determines the CSFB idle mode count by monitoring Initial Context Setup Request messages (e.g., messages including a CSFB indicator) on a S1-MME network interface of the MME node and determines the CSFB active mode count by monitoring UE Context Modification Request messages (e.g., messages including the CSFB indicator) on the S1-MME network interface of the MME node.

In further embodiments, the network monitoring system or node also determines an estimated success rate for MT CSFB calls. In particular, the network monitoring system determines a SGs paging count for MT CSFB calls for UE from one or more paging messages communicated on a SGs network interface of the MME node and determines a SGs service count for MT CSFB calls for UE from one or more service request messages communicated on the SGs network interface of the MME node. The network monitoring system determines the estimated success rate for MT CSFB calls based on at least one of the SGs service count and the estimated total number of CSFB call successes in relation to the SGs paging count and assigns the estimated success rate for MT CSFB to one or more KPIs. With respect to determining the estimated success rate, the network monitoring system determines a minimum value between the SGs service count and the estimated total number of CSFB call successes and divides such minimum value by the SGs paging count to yield the estimated success rate for MT CSFB calls.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIGS. 8A-8B illustrate an example simplified procedure for network monitoring and determining KPIs using inferential statistics, particularly from the perspective of a network monitoring system.

A component or a feature that is common to more than one drawing is indicated with the same reference number in each of the drawings.

DESCRIPTION OF EXAMPLE EMBODIMENTS

Long Term Evolution (LTE) networks provide high throughput, lower latency, and superior end-user experiences. Accordingly, LTE networks and LTE protocols have been largely embraced by mobile operators and cell phone manufacturers as the next generation technology. However, at present, data remains the only service supported. That is, voice services typically remain within traditional Circuit Switched (CS) voice networks until both data and voice services are be shifted and supported by LTE infrastructure (e.g., using Voice over IP on LTE or VoLTE protocols). In the interim, service providers, hardware manufactures, and the like employ various solutions to address the dichotomy between the CS domain and LTE infrastructure (i.e., a packet switched (PS) infrastructure).

One of these possible interim solutions sponsored by the 3GPP community, use Circuit-Switched FallBack (CSFB) techniques when, for example, a user's mobile device is operating in LTE (PS data) mode. In this LTE mode, the network pages the user's mobile device when a CS call comes in (CS data). The user's mobile device responds with a special service request message to the LTE network, and the LTE network signals the device to move or "fall back" to CS infrastructure (i.e., 2G/3G) to accept the incoming call. Similarly for outgoing calls, the same special service request is used to inform the LTE network the mobile device intends to move to 2G/3G to place the outgoing call. Put differently, CSFB is a 3GPP-defined standard solution whereby LTE handsets drop existing LTE connection to revert, or "fall back" to the 2G or 3G radio network whenever the user needs to make or receive a call. Upon ending the call the device can move back to the LTE network or it can remain in the 2G/3G network.

Figure 1:
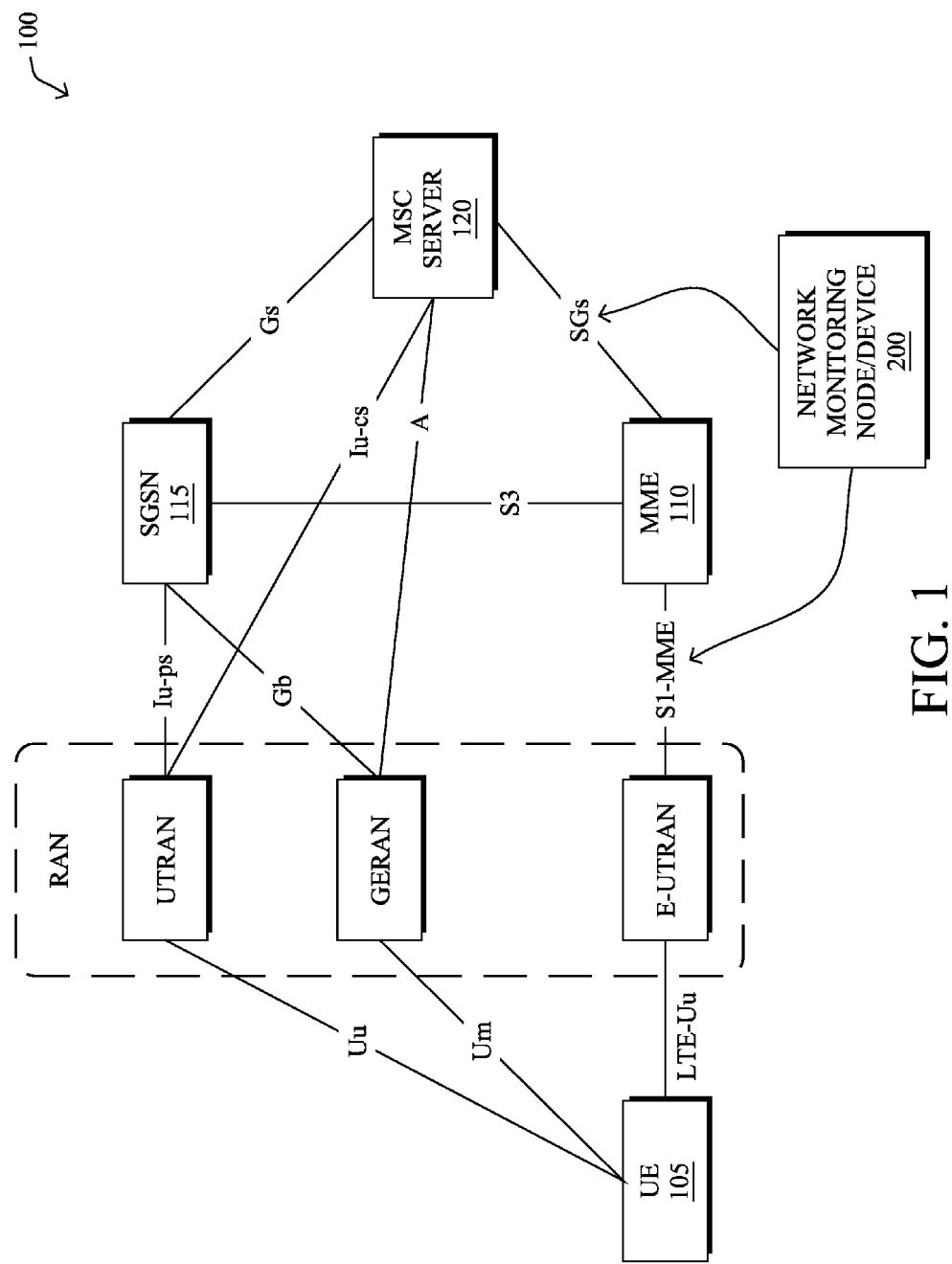
FIG. 1 illustrates an example communication network.

Referring now to the drawings, FIG. 1 illustrates an example communication network 100, showing conventional CS nodes/devices and corresponding network interfaces, including UTRAN and GERAN access networks. Such "legacy" networks supports even the CS services, in addition to PS services.

In particular, network 100 is a geographically distributed collection of nodes interconnected by communication links and segments for transporting control plane and user plane data between end nodes, such as user equipment (UE), or other devices/nodes. Nodes/devices in communication network 100 include UE 105 (e.g., a mobile device), various Radio Access Networks (RANs) including UTRAN, GERAN, and E-UTRAN, a Mobility Management Entity (MME) node 110, a Serving GPRS Support Node (SGSN) 115, and a Mobile Switching Center (MSC) Server 120.

As discussed above, interim solutions, including LTE capable mobile devices or UE use legacy Circuit Switched network infrastructure for CS data while data services (generally) use LTE network infrastructure. Operationally, for these interim solutions, MME node 110 serves UE 105 for data using LTE network access and MSC Server 120 for voice using CS network access. Notably, SGSN 115 serves UE 105 using data services over legacy PS network infrastructure (e.g., LTE radio coverage is not available).

With respect to CSFB signaling and SMS data transfer for LTE devices, MME node 110 connects to MSC Server 120. A network interface SGs operatively communicates data between MSC server 120 and MME node 110 and enable UE 105 to be both CS and PS registered while on the LTE access network. The SGs interface also supports CS pages via the LTE access, as well as SMS, without having the device leave LTE.

As discussed above, UE 105 receives an incoming call (mobile terminating CS voice call), which triggers a page via LTE network infrastructure to UE 105. The page initiates CSFB to move UE 105 to the CS network infrastructure to receive the call. In response to the page, UE 105 sends an extended service request message for MT CSFB service to the LTE infrastructure and transitions to the CS (i.e., 2G/3G)

legacy network. Once transitioned, the legacy call setup procedures are followed to setup the CS call. Likewise, mobile originating (outgoing) calls from UE 105 follow a similar transition from LTE (PS) to 2G/3G (CS), except for the paging step, which is not needed. In this case the Extended Service Request message is marked for MO CSFB service. Generally, in 3G networks, PS data sessions can also move for simultaneous voice and data services and, in 2G networks, PS data sessions may be suspended until the voice call ends and UE 105 returns to LTE, unless the 2G network supports dual transfer mode (DTM), which permits simultaneous voice and data. Notably, when the voice call ends, UE 105 returns to LTE via idle mode or connected mode mobility procedures.

Figure 2:
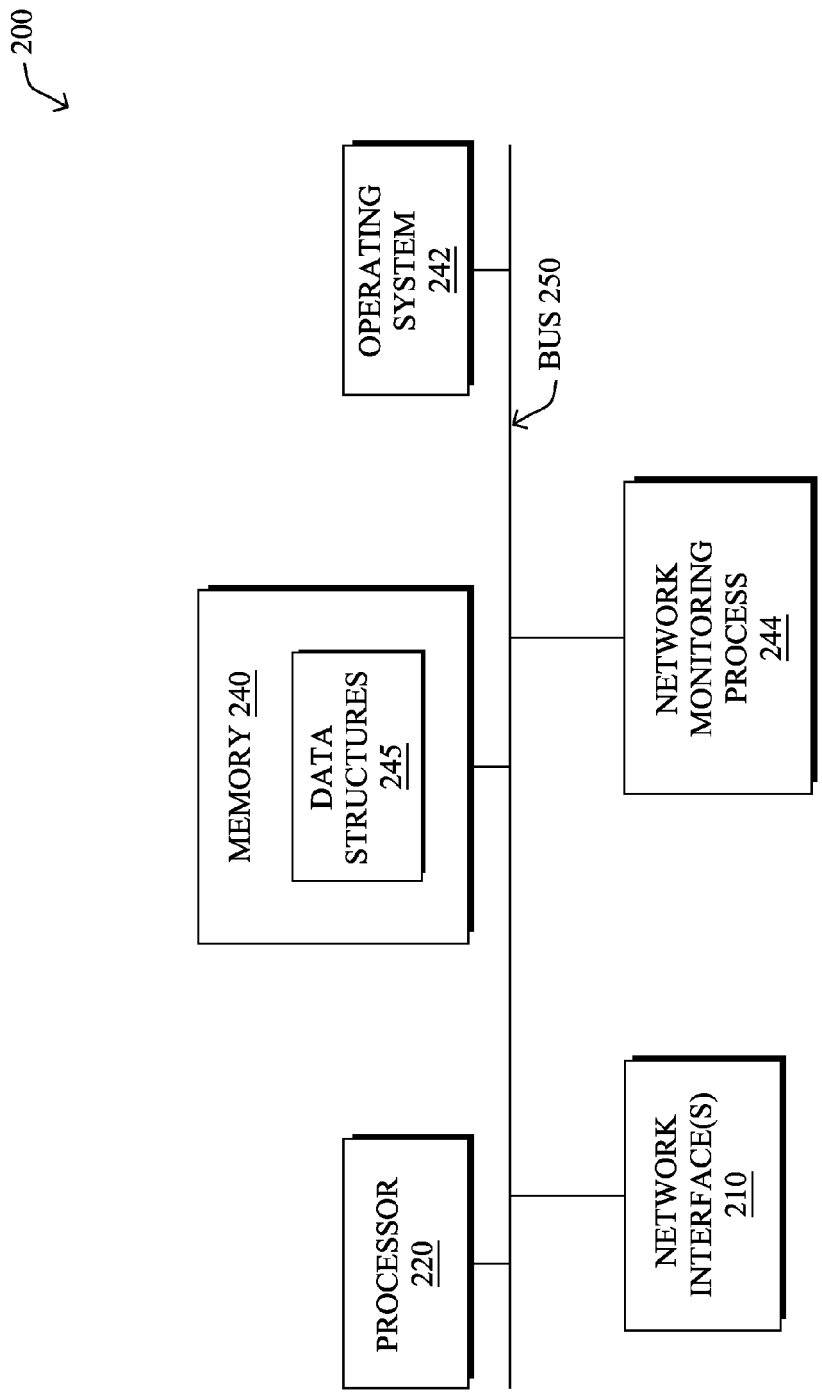
FIG. 2 illustrates an example network device/node.

FIG. 2 illustrates an example network device/node 200 that may be used with one or more embodiments described herein, e.g., as a network monitoring device or system (shown in FIG. 1). Device 200 comprises one or more network interfaces 210, at least one hardware processor 220, and a memory 240 interconnected by a system bus 250.

The network interface(s) 210 contain the mechanical, electrical, and signaling circuitry for communicating data over physical and/or wireless links coupled to the network 100, and tapping network interfaces in non-intrusive ways to monitor network data (e.g., packets, messages, requests, PDU Packet Data Units for control plane or user plane, etc.). The network interfaces may be configured to transmit, receive, and/or monitor data using a variety of different communication protocols, including, inter alia, TCP/IP, 3GPP protocols, 2G, 3G, 4G protocols (e.g., S1-AP, SGs-AP, GTP, etc.), UDP, wireless protocols (e.g., IEEE Std. 802.15.4, WiFi, Bluetooth®), Ethernet, powerline communication (PLC) protocols, etc.

The memory 240 comprises a plurality of storage locations that are addressable by the processor 220 and the network interfaces 210 for storing software programs and data structures associated with the embodiments described herein. Certain devices may have limited memory or no memory (e.g., no memory for storage other than for programs/processes operating on the device). The processor 220 may comprise necessary elements or logic adapted to execute the software programs and manipulate data structures 245, such as data from captured network messages. An operating system 242, portions of which are typically resident in memory 240 and executed by the processor, functionally organizes the device by, inter alia, invoking operations in support of software processes and/or services executing on the device. These software processes and/or services may comprise network monitoring process/services 244. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Network monitoring process (services) 244 contains computer executable instructions executed by the processor 220 to perform functions such as monitoring data flow on one or more network interfaces, sniffing for particular data packets, and the like, as will be understood by those skilled in the art.

Illustratively, the techniques described herein may be performed by hardware, software, and/or firmware, such as in accordance with the network monitoring process 244, which may contain computer executable instructions executed by the processor 220 (or independent processor of interfaces 210) to perform functions relating to the techniques described herein.

As noted above, the techniques (e.g., network monitoring process 244) described herein determine Key Performance Indicators (KPIs) and corresponding dimensions using inferential statistical approaches. Such inferential statistical approaches obviate the need to perform end-to-end correlation of data thereby conserving valuable processing resources. Such KPIs can include, for example, quantifying network performance, network load, and the like. As discussed herein, certain example embodiments are discussed with respect to the LTE Circuit Switched FallBack (CSFB) scenario, however such embodiments are provided for illustration and not limitation.

Figure 3:
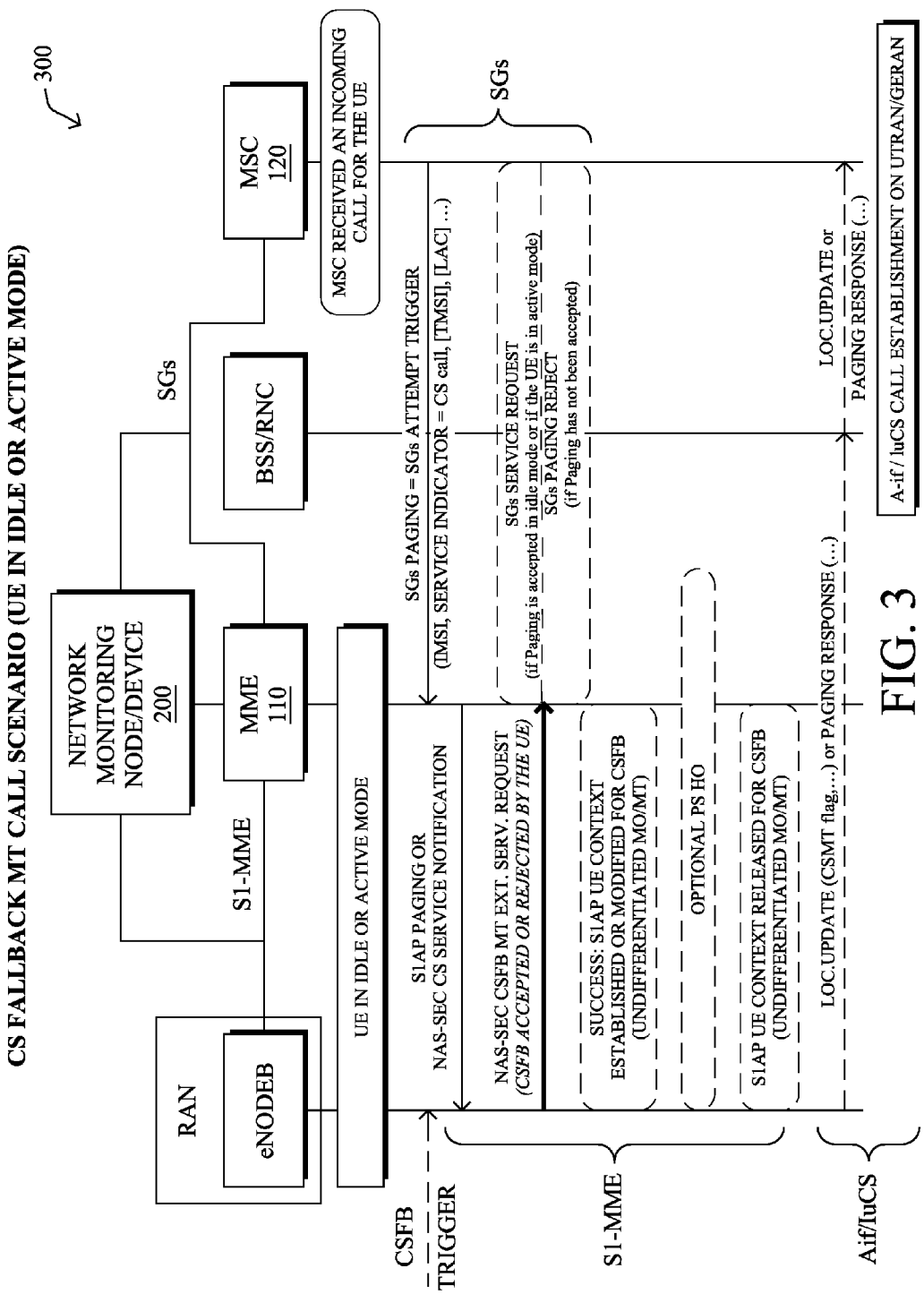
FIG. 3 illustrates an example signaling diagram showing, in part, messages in a Mobile Terminating CSFB scenario for User Equipment (UE) in an idle mode or an active mode; Changes made in FIG. 3 per instructions.
Figure 4:
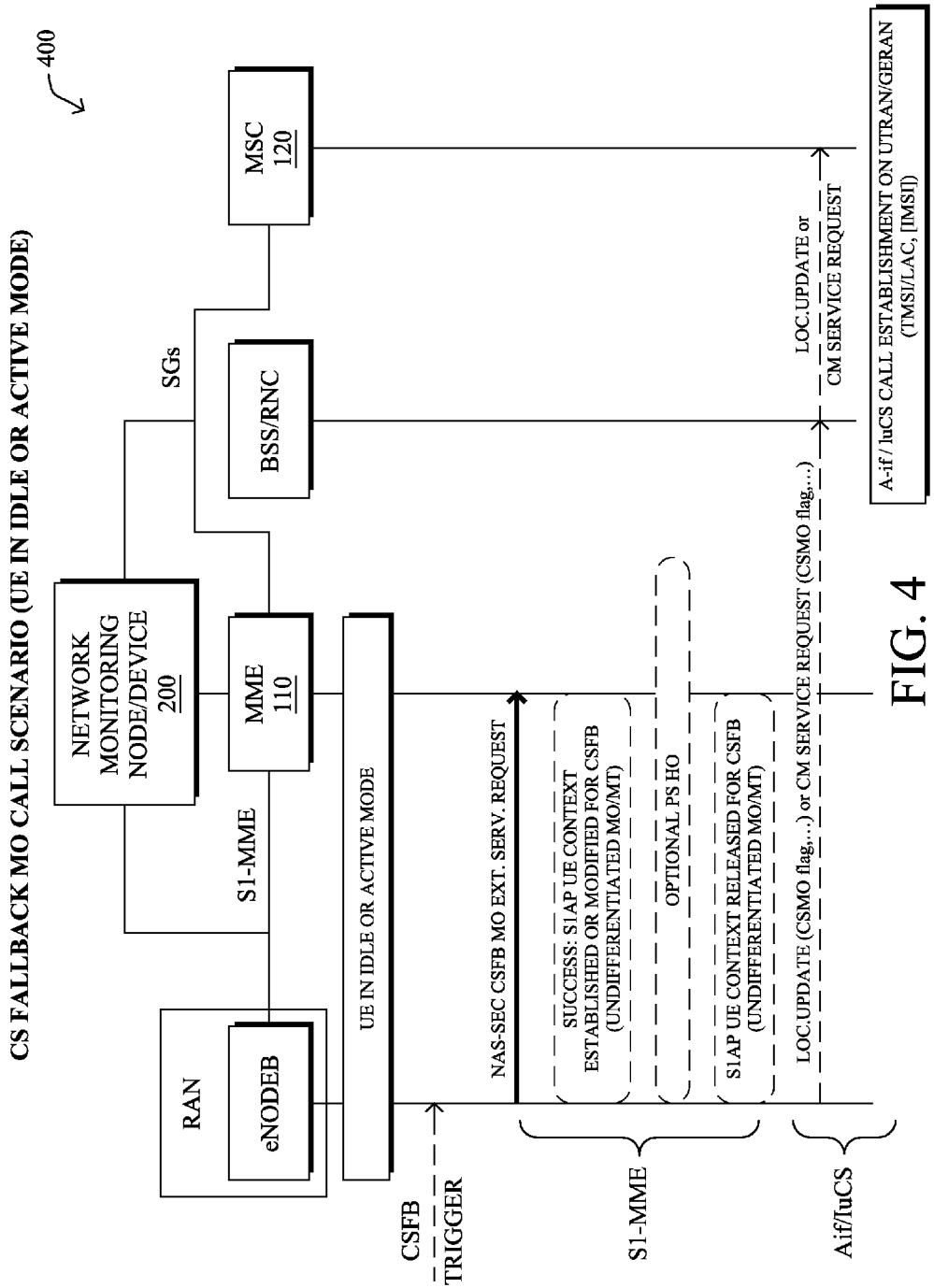
FIG. 4 illustrates an example signaling diagram showing, in part, messages in a Mobile Originating CSFB scenario for UE in the idle or the active mode.

Referring now to FIG. 3 and FIG. 4, two signaling diagrams—diagram 300 and diagram 400—showing signaling or messages in a Mobile Terminating (MT) CSFB scenario and a Mobile Originating CSFB scenario both for UE in an idle mode and in an active mode, respectively. Notably, MT Roaming Retry and MT Roaming Forwarding signaling are not shown in diagram 300 since such signaling does not impact the techniques discussed herein when determining KPIs.

In general, the techniques for determining the above-discussed KPIs consider the S1-MME interface and the SGs interface separately, extracts data from each, and merges the information at an application level. The techniques further determine statistical inferences to estimate success/failure call ratios from portions of the extracted data and apply such ratios when determining totals for estimated call success and call failure.

With respect to the SGs interface, network monitoring node 200 monitors a plurality of messages communicated on the SGs interface particularly shown in signaling diagram 300 and determines certain KPIs including, for example, a count for paging attempts and a count for service request messages, each for the MT CSFB scenario.

In particular, the network monitoring node 200 determines a total number of MT CSFB Paging attempts ("SGs_PA") by a count or summation of "SGs Paging" messages that indicate a CS Call as follows:

SGs_PA=Σ(SGs PAGING messages with Service Indicator=CS call).

Notably, the retry counter is set to 2 when "Paging Guard Timer" Ts5 expires since this timer can be configured by NO with a value in the range 2 s-20 s. In this fashion, the SGs_PA indicate a KPI for the SGs interface that provides a total number of MT CSFB paging attempts for idle mode and active mode UEs.

Network monitoring node 200 also determines a total number of SGs service request messages (i.e., SGs_SR") by a count or summation of SGs Service request messages that indicate a CS Call as follows:

SGs_SR=Σ(SGs SERVICE REQUEST messages with Service Indicator=CS call).

In this fashion, the SGs_SR indicates a KPI for the SGs interface that provides a total number of MT CSFB idle mode successes and active mode attempts for UEs. Notably, this KPI does not indicate success for UEs in active mode—UEs in active mode paged by MME node 110 since, in this UE mode, a SGs SERVICE REQUEST is sent immediately by MME to the MSC/VLR as a response to the PAGING, independently from the UE's answer.

In improving accuracy of success/failure rates, the techniques described herein further monitor and analyze messages or variables communicated on the S1-MME interface of the MME node 110 and define one or more inferred mobile terminating call ratios (e.g., estimated success rates or percentages) and use such inferred mobile terminating call ratio(s) and counters corresponding to volumes of CSFB calls to yield Key Performance Indicators (KPIs) indicating total values for successful CSFB calls and the like to determine estimated total volume of successful/failed calls.

In particular, in determining KPIs regarding success/failure rates, one or more of the following is/are assumed: data on the S1-MME interface is ciphered at the NAS-SEC layer, in some S1-MME sessions, IMSI is not present (only S-TMSI is present), correlation S-TMSI-to-IMSI is not available, the network monitoring node/system is not able to decipher the encrypted NAS-SEC PDUs (e.g., a lack of encryption keys, etc.).

From the S1-MME interface, again referring to signaling diagrams 300-400, the network monitoring node 200 determinates counters by monitoring a plurality of messages on the S1-MME interface. These counters include, in part, a Mobile Terminating (MT) counter (NASSEC-CSFB-MT-EXTSR counter) and a Mobile Originating (MO) counter (NASSEC-CSFB-MO-EXTSR counter).

The MT counter is incremented by the network monitoring node 200 for CSFB service requests on the S1-MME interface (e.g., NAS-SEC Extended Service Request) that indicate Mobile Terminating (MT) calls (in clear text or deciphered). For example, the MT counter is incremented for each extended service request for MT calls for UEs in idle mode (since each service request is over the initial S1-AP UE message, which is in clear text (by specification) and, when deciphered, for UEs in active mode). Similarly, the MO counter is incremented for CSFB service requests (e.g., NAS-SEC Extended Service Request) indicating Mobile Originating (MO) calls (clear text or deciphered).

Based on the MT counter and the MO counter, the network monitoring node 200 defines an inferred mobile terminating call ratio ($r_{CSFB\_MT}$) as follows:

$$r_{CSFB\_MT} = \text{MT counter}/(\text{MT counter} + \text{MO counter}).$$

Alternatively, using variable names for the MT counter and the MO counter:

$$r_{CSFB\_MT} = \frac{NASSEC - CSFB - MT - EXTSR}{NASSEC - CSFB - MT - EXTSR + NASSEC - CSFB - MO - EXTSR}\%$$

In this fashion, the inferred mobile terminating call ratio is defined by computing a percentage of MT CSFB over the total number of MO CSFB and MT CSFB. However, the inferred mobile terminating call ratio only considers deciphered or clear text CSFB extended service request messages. This inferred mobile terminating call ratio is further applied to additional counters determined by the network monitoring node 200, which additional counters include a MTMO$_{active}$ counter (S1AP-CSFB-MTMO-UECTXMOD) for a total number of CSFB MT and MO call successes for UE in active mode and a MTMO$_{idle}$ counter (S1AP-CSFB-MTMO-INITCTXSETUP) for a total number of MT and MO call successes for UE in idle mode.

Notably, counter corresponding to the total number of CSFB MT and MO successes for UE in active mode is determined by monitoring S1-AP UE context modification request messages on the S1-MME interface that have the CSFB indicator set. The counter corresponding to the total number of CSFB MT and MO successes for UE in idle mode is determined by monitoring initial context setup request messages that have the CSFB indicator set. Notably, each counter determines the total number of MT and MO successes (active and idle) independent from deciphering and independent from IMSI.

Accordingly, the network monitoring node 200 applies the inferred mobile terminating call ratio to each of the MT and MO counters (active and idle) to yield an estimated number of CSFB MT successes as follows:

$$S_{CSFB\_MT\_Idle} = \text{MTMO}_{idle} * r_{CSFB\_MT}$$

$$S_{CSFB\_MT\_Active} = \text{MTMO}_{active} * r_{CSFB\_MT}$$

In sum, the network monitoring node 200 determines KPIs from each of the SGs interface and the S1-MME interface including:

SGs_PA: Total #MT CSFB Paging attempts for idle mode and active mode UEs

SGs_SR: Total #MT CSFB Idle mode success+Active mode attempts $S_{CSFB\_MT\_Idle}$=Estimation of Total #CSFB MT Successes in Idle mode $S_{CSFB\_MT\_Active}$=Estimation of Total #CSFB MT Successes in Active mode From these KPIs, the network monitoring node 200 further determines an estimated total number of MT CSFB successes as follows:

S1AP_S=$S_{CSFB\_MT\_Idle}$+$S_{CSFB\_MT\_Active}$

Further, the estimated success rate for MT CSFB can be defined as follows:

$$MT\ CSFB\ \text{Success Rate} = \frac{\text{Min}\{SGs\_SR, S1AP\_S\}}{SGs\_PA}\%$$

Dimensions: MME, time, [IMSI, if present], [LAI, if present]

Figure 5:
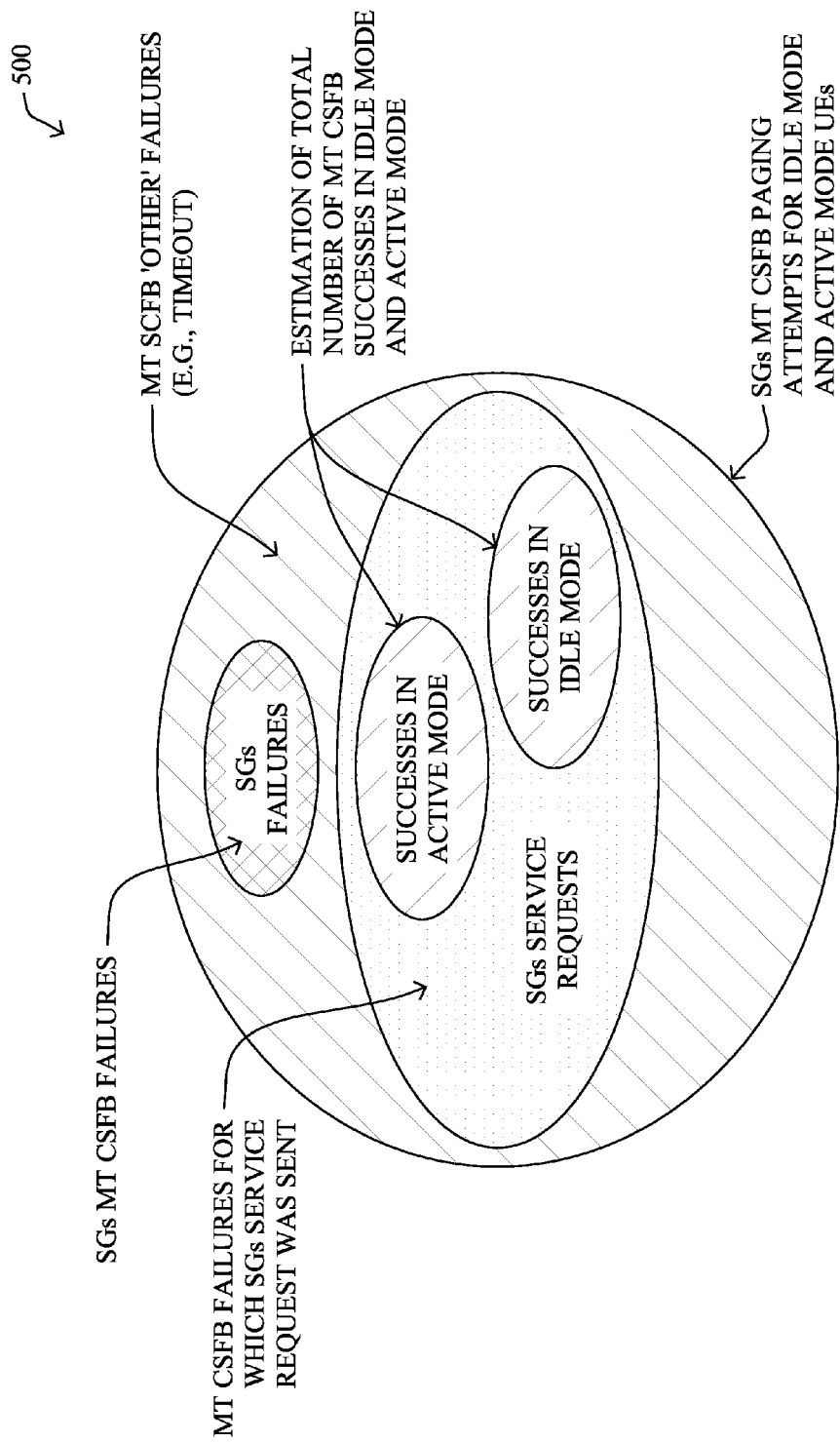
FIG. 5 illustrates an example chart showing Key Performance Indicators determined using inferred statistics.

In this fashion, network monitoring node 200 determines KPIs such as the total count or volume of Mobile Terminating successes in idle mode, active mode, in the aggregate (idle and active), and total success rates, even when end-to-end data/traffic correlation is not possible (e.g., due to encrypted traffic). An exemplary chart 500 shown in FIG. 5, illustrates each of these resulting KPIs (e.g., resultant KPIs determined by the above described inferred statistical techniques).

As discussed above, the inferred mobile terminating call ratio infers information about MT CSFB for both deciphered and ciphered (encrypted) messages by determining counters corresponding to deciphered MT and MO CSFB messages. However such inferences maintain adequate accuracy within tolerances or standards of deviation.

Validating Statistical Inferences

In particular, assume that Xi is the random variable that has the following definition:

$$Xi = \begin{cases} \text{Generic } CSFB\ Ext.\ Serv.Req. = MT_{CSFB}, & \text{with probability } p \\ \text{Generic } CSFB\ Ext.Serv.Req. = MO_{CSFB}, & \text{with probability } q = 1 - p \end{cases}$$

Where "Generic" means ciphered and deciphered. Note that deciphering does not favor MO against MT.

Calculating the ratio Xc of deciphered CSFB MT$_{CSFB}$ a service requests (EXT.SERV.REQ) against the total number of deciphered CSFB service request samples (CSFB EXTENDED SERVICE REQUEST) for MO calls and MT calls is as follows:

$$X_c = \frac{MT_{CSFBdec}}{MT_{CSFBdec} + MO_{CSFBdec}}$$

According to the above, Xc represents a percentage (%) of deciphered $MT_{CSFB}$ service requests (EXT.SERV.REQ) and is the same as the above ratio "$r_{CSFB\_MT}$". Next, the estimated probability "p" of Xi is determined based on the Xc measurement. Put differently, the estimated probability "p" is the same probability that a "Generic CSFB EXT.SERV.REQ" is a $MT_{CSFB}$ call using the measured value Xc.

Applying inferential statistics, Xc is named "estimator" of the probability "p". According to inferential statistics, inferring the probability of an event is based on the observation of a sample of the entire statistical population. According to the CSFB scenario, the sample corresponds to the deciphered service messages (EXT.SERV.REQ) while the whole population corresponds to the total number of Generic CSFB services messages (EXT.SERV.REQ) including both ciphered and deciphered messages.

Using inferential statistics, the probability "p" assumes the value Xc with a certain Interval of Confidence ("IoC"), named +/−δ as follows:

$$X_c - \delta < p < X_c + \delta \quad (1)$$

According the above IoC formula, the probability that a Generic CSFB service message (EXT.SERV.REQ) is a $MT_{CSFB}$ stays within a δ interval around the Xc value (recall, Xc is the % of deciphered $MT_{CSFB}$ service request messages (EXT.SERV.REQ)).

Characterizing the IoC δ interval for the "p" estimation is again accomplished using inferential statistics. According to inferential statistics, δ is inversely proportional to two elements:

(1) a number of samples N used to compute Xc; and
(2) a statistical "Level of Error" (α), that represents a probability that IoC formula or relationship (1), above, is true. For example a "Level of Error" α<1% means that the IoC relation in (1) is true with probability >0.99 (statistical error <1%).

Using the number of samples N and the level of error α, the IoC formula is as follows:

$$X_c - \frac{1}{2\sqrt{N\alpha}} < p < X_c + \frac{1}{2\sqrt{N\alpha}} \quad (2)$$

Once Xc is determined on a number N of samples and an appropriate level of error α is defined, the Interval of Confidence for the probability "p" using relation (2) is determined.

For example, for α<1% and n=40,000 samples (with 21,000 of the samples being MT CSFB services requests (EXT SERV.REQ)):

Xc~52% with IoC boundaries in relation (2) being +/−2.5%

Accordingly, the probability "p" relationship is defined as follows:

$$p = \frac{MT_{CSFB}}{MT_{CSFB} + MO_{CSFB}} = 0.52 + /-0.025 = 52\% + /-2.5\%$$

Figure 6:
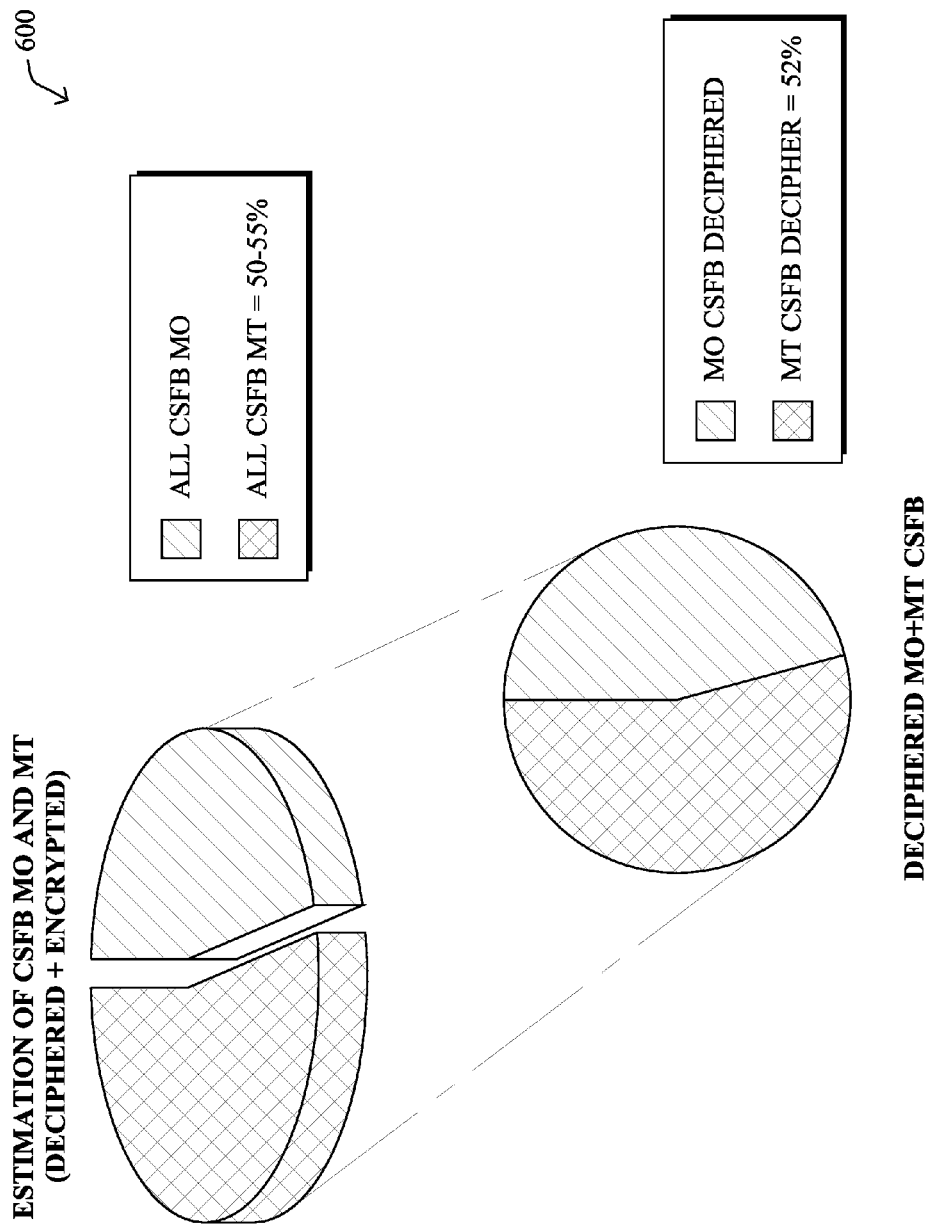
FIG. 6 illustrates an example chart showing an estimated number of Circuit Switched FallBack (CSFB) Mobile Originating (MO) and Mobile Terminating (MT) calls, including both deciphered and ciphered)

Thus, for 21,000 deciphered samples of service request messages and 40,000 total service request messages, the MT ratio for the deciphered sample yields 52% of the total deciphered service request messages. The inferred probability "p" to have an MT CSFB on the entire population of EXT.SERV.REQ. (deciphered and ciphered) is 52%+/−2.5%, true statistically in 99%/o of cases. FIG. 6 illustrates an example chart 600 that illustrates a graph of the inferential method for the above described example and particularly highlights the estimated number of CSFB MO calls and MT calls which calls include both deciphered and ciphered or encrypted data.

Figure 7:
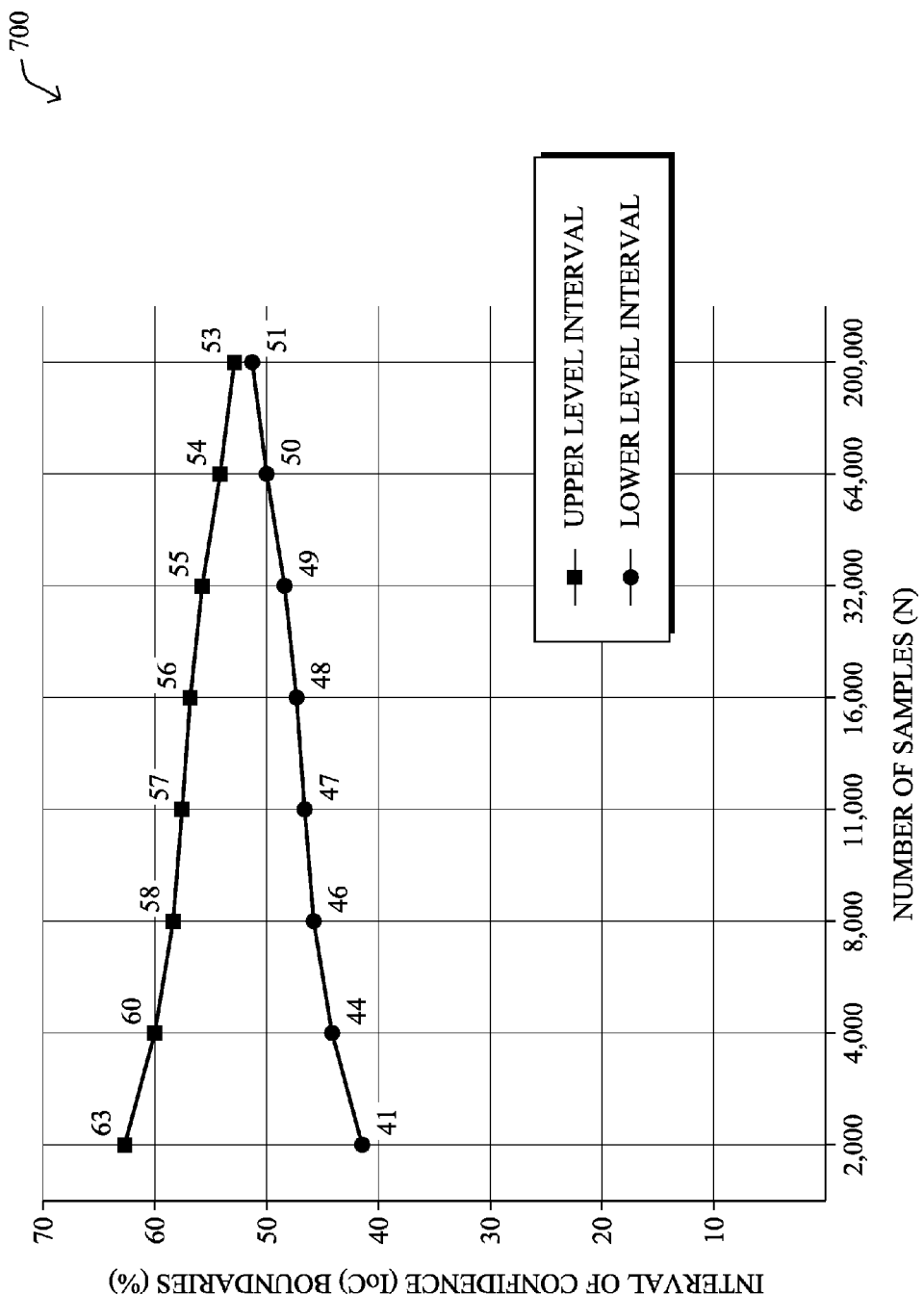
FIG. 7 illustrates an example chart showing iterative plots of resultant tolerances values for an Interval of Confidence with increasing numbers of samples measuring accuracy of the inferred statistical techniques when determining KPIs.

FIG. 7 illustrates an example chart 700 showing iterative plots of several examples of the IoC interval in a simulation with α<1% and increasing number of samples N (with the same % of MT). In particular, the IoC interval shown in chart 700 decreases as N increases.

Figure 8B:
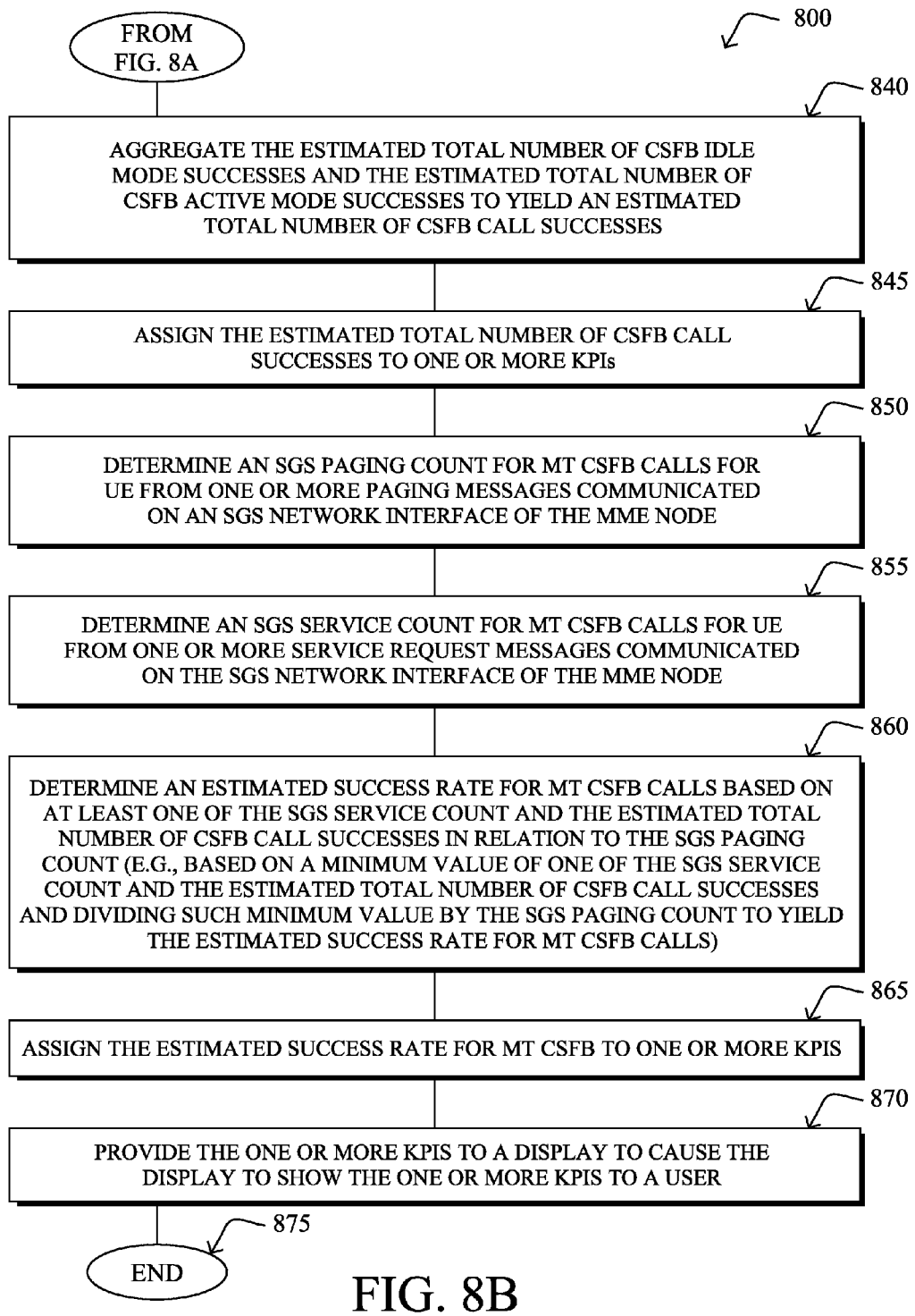

FIGS. 8A-8B illustrate an example simplified procedure 800 for determining KPIs in a CSFB scenario using inferential statistics, particularly from the perspective of a network monitoring system (e.g., network node 200) and in accordance with one or more embodiments described herein.

Procedure begins at step 805 and continues to step 810 where, as discussed above, the network monitoring node monitors a plurality of messages for a network interface. For example, the network monitoring node monitors the SGs network interface and the S1-MME interface for the MME node 110. The network monitoring node further determines a Mobile Terminating (MT) count for MT calls for User Equipment from one or more of the monitored messages in step 815 and determines a Mobile Originating (MO) count for MO calls for UE from the messages in step 820. Generally, the MT count and the MO count are determined from deciphered or clear text data of the monitored messages. In step 825, the network monitoring node defines an inferred MT ratio based on the MT count and the MO count (e.g., $r_{CSFB\_MT}$), as discussed in greater detail above. The inferred MT ratio or $r_{CSFB\_MT}$ is applied, in step 830, to at least one of a CSFB idle mode count (e.g., determined from initial context setup request messages, typically including a CSFB indicator) and/or a CSFB active mode count (e.g., determined from UE context modification request messages typically including the CSFB indicator) to yield an estimated total number of CSFB idle mode successes and an estimated total number of CSFB active mode successes, respectively. Each of the estimated total number of CSFB idle mode successes and estimated total number of CSFB active mode successes are assigned to one or more Key Performance Indicators (KPIs) in step 835.

Referring to FIG. 8B, procedure 800 continues to step 840, where, in certain embodiments, the network monitoring node (step 840) aggregates the estimated total number of CSFB idle mode successes and the estimated total number of CSFB active mode successes to yield an estimated total number of CSFB call successes and assigns (step 845) the estimated total number of CSFB call successes to one or more KPIs. The network monitoring node further monitors or detects messages on the SGs network interface of the MME node and determines an SGs paging count for MT CSFB calls (step 850) and a SGs service count for MT CSFB calls (step 855).

In step 860, the network monitoring node determines an estimated success rate for MT CSFB calls based on at least one of the SGs service count and the estimated total number of CSFB call successes in relation to the SGs paging count. In particular, as discussed above, the network monitoring node determines a minimum value as between the SGs service count and the estimated total number of CSFB call successes and divides such minimum value by the SGs paging count to yield the estimated success rate for MT CSFB calls. The estimated success rate for MT CSFB is assigned, in step 865, to one or more KPIs and in step 870, the one or more KPIs are provided by the network monitoring node to a display to cause the display to show the KPIs to a user. Procedure 800 ends at step 875, but may begin again at step 810, where the network monitoring node monitors messages from network interfaces of the MME node.

It should be noted that certain steps within procedure 800 may be optional, and that the steps shown in FIGS. 8A-8B are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, determine one or more Key Performance Indicators (KPIs) in a communication network using inferential statistics and obviate the need for expensive and complex data correlation. In particular, the techniques herein significantly reduce the overhead required to determine KPIs for various scenarios, particularly a Circuit Switched FallBack (CSFB) scenario.

While there have been shown and described illustrative embodiments that determine KPIs without data correlation by defining various inferred call ratios in a Long Term Evolution (LTE) network, it is to be understood that various other adaptations and modifications may be made within the spirit and scope of the embodiments herein. For example, the embodiments have been shown and described herein with relation to a MME node in LTE networks. However, the embodiments in their broader sense are not as limited, and may, in fact, be used with other types of networks and/or protocols (e.g., other types of 3GPP networks and network protocols).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for determining one or more Key Performance Indicators (KPIs) using inferred statistics, the method comprising:
   monitoring, by a network monitoring device, a plurality of messages for a network interface in a communication network;
   determining, by the network monitoring device, a Mobile Terminating (MT) count for MT calls for User Equipment (UE) from at least one message of a plurality of messages;
   determining, by the network monitoring device, a Mobile Originating (MO) count for MO calls for the UE from at least one variable of the plurality of messages;
   defining, by the network monitoring device, an inferred MT ratio based on the MT count and the MO count;
   applying, by the network monitoring device, the inferred MT ratio to at least one of a Circuit Switched FallBack (CSFB) idle mode count indicating a number of successful CSFB calls for UE in an idle mode and a CSFB active mode count indicating a number of successful CSFB calls for UE in an active mode to yield an estimated total number of CSFB idle mode successes and an estimated total number of CSFB active mode successes, respectively;
   assigning, by the network monitoring device, each of the estimated total number of CSFB idle mode successes and the estimated total number of CSFB active mode successes to one or more Key Performance Indicators (KPIs); and
   providing, by the network monitoring device, the one or more KPIs to a display to cause the display to show the one or more KPIs to a user.

2. The method of claim 1, further comprising:
   determining, by the network monitoring device, the CSFB idle mode count by monitoring initial context setup request messages on a S1-MME network interface of the MME node.

3. The method of claim 1, further comprising:
   determining, by the network monitoring device, the CSFB active mode count by monitoring UE context modification request messages on the S1-MME network interface of the MME node.

4. The method of claim 1, wherein, applying the inferred mobile terminal call ratio by the network monitoring device further comprises:
   aggregating, by the network monitoring mode, the estimated total number of CSFB idle mode successes and the estimated total number of CSFB active mode successes to yield an estimated total number of CSFB call successes; and
   assigning, by the network monitoring device, the estimated total number of CSFB call successes to one or more KPIs.

5. The method of claim 1, further comprising:
   determining, by the network monitoring device, a SGs paging count for MT CSFB calls for UE from one or more paging messages communicated on a SGs network interface of the MME node;
   determining, by the network monitoring device, a SGs service count for MT CSFB calls for UE from one or more service request messages communicated on the SGs network interface of the MME node;
   determining, by the network monitoring node, an estimated success rate for MT CSFB calls based on at least one of the SGs service count and the estimated total number of CSFB call successes in relation to the SGs paging count; and
   assigning, by the network monitoring node, the estimated success rate for MT CSFB to one or more KPIs.

6. The method of claim 5, wherein determining the estimated success rate for MT CSFB calls comprises:
   determining, by the network monitoring device, a minimum value of one of the SGs service count and the estimated total number of CSFB call successes; and
   dividing, by the network monitoring device, the minimum value by the SGs paging count to yield the estimated success rate for MT CSFB calls.

7. The method of claim 1, wherein ciphered messages are excluded from each of the at least one message of the plurality of messages when the network monitoring device determines the MT count for MT calls for UE and the MO count for MO calls for the UE.

8. The method of claim 1, wherein the communication network includes a Long Term Evolution (LTE) network.

9. The method of claim 1, wherein the network interface in the communication network includes one or more network interfaces operatively coupled to a Mobility Management Entity (MME) node in a Long Term Evolution Network.

10. An network monitoring node, comprising:
one or more network interfaces adapted to communicate in a communication network;
a processor adapted to execute one or more processes; and
a memory configured to store a process executable by the processor, the process when executed by the processor causes the processor to:
monitor a plurality of messages for a network interface in a communication network;
determine a Mobile Terminating (MT) count for MT calls for User Equipment (UE) from at least one message of the plurality of messages;
determine a Mobile Originating (MO) count for MO calls for the UE from at least one message of the plurality of messages;
define an inferred MT ratio based on the MT count and the MO count;
apply the inferred MT ratio to at least one of a Circuit Switched FallBack (CSFB) idle mode count that indicates a number of successful CSFB calls for UE in an idle mode and a CSFB active mode count that indicates a number of successful CSFB calls for UE in an active mode to yield an estimated total number of CSFB idle mode successes and an estimated total number of CSFB active mode successes, respectively;
assign each of the estimated total number of CSFB idle mode successes and the estimated total number of CSFB active mode successes to one or more Key Performance Indicators (KPIs); and
provide the one or more KPIs to a display to cause the display to show the one or more KPIs to a user.

11. The network monitoring device of claim 10, wherein the process, when executed by the processor further causes the processor to:
determine the CSFB idle mode count by monitoring initial context request setup messages on a S1-MME network interface of the MME node.

12. The network monitoring device of claim 10, wherein the process, when executed by the processor further causes the processor to:
determine the CSFB active mode count by monitoring UE context modification request messages on the S1-MME network interface of the MME node.

13. The network monitoring device of claim 10, wherein the process to apply the inferred mobile terminal call ratio by the network monitoring device further causes the processor to:
aggregate the estimated total number of CSFB idle mode successes and the estimated total number of CSFB active mode successes to yield an estimated total number of CSFB call successes; and
assign the estimated total number of CSFB call successes to one or more KPIs.

14. The network monitoring device of claim 10, wherein the process, when executed by the processor further causes the processor to:
determine a SGs paging count for MT CSFB calls for UE from one or more paging messages communicated on a SGs network interface of the MME node;
determine a SGs service count for MT CSFB calls for UE from one or more service request messages communicated on the SGs network interface of the MME node;
determine an estimated success rate for MT CSFB calls based on at least one of the SGs service count and the estimated total number of MT CSFB call successes in relation to the SGs paging count; and
assign the estimated success rate for MT CSFB to one or more KPIs.

15. The network monitoring device of claim 14, wherein the process to determine the estimated success rate for MT CSFB calls further causes the processor to:
determine a minimum value of one of the SGs service count and the estimated total number of CSFB call successes; and
divide the minimum value by the SGs paging count to yield the estimated success rate for MT CSFB calls.

16. The network monitoring device of claim 10, wherein the process to determine the MT count for MT calls for UE and determine the MO count for MO calls for UE causes the processor to further exclude ciphered messages from each of the at least one message of the plurality of messages, respectively.

17. The network monitoring device of claim 10, wherein the one or more network interfaces communicate with each of a SGs network interface and a S1-MME interface.

18. The network monitoring device of claim 10, wherein the communication network is a Long Term Evolution (LTE) communication network.

19. A tangible, non-transitory, computer-readable media having software encoded thereon, the software, when executed by a processor, operable to:
monitor a plurality of messages for a network interface in a communication network;
determine a Mobile Terminating (MT) count for MT calls for User Equipment (UE) from at least one message of the plurality of messages;
determine a Mobile Originating (MO) count for MO calls for the UE from at least one message of the plurality of messages;
define an inferred MT ratio based on the MT count and the MO count;
apply the inferred MT ratio to at least one of a Circuit Switched FallBack (CSFB) idle mode count that indicates a number of successful CSFB calls for UE in an idle mode and a CSFB active mode count that indicates a number of successful CSFB calls for UE in an active mode to yield an estimated total number of CSFB idle mode successes and an estimated total number of CSFB active mode successes, respectively;
assign each of the estimated total number of CSFB idle mode successes and the estimated total number of CSFB active mode successes to one or more Key Performance Indicators (KPIs); and
provide the one or more KPIs to a display to cause the display to show the one or more KPIs to a user.

* * * * *